(12) United States Patent
Pascasio et al.

(10) Patent No.: US 7,707,280 B2
(45) Date of Patent: Apr. 27, 2010

(54) VIRTUAL CIRCUIT IDENTIFICATIONS FOR HYBRID POINT-TO-POINT NETWORKS

(75) Inventors: Jorey Pascasio, San Antonio, TX (US); William Healy, Wallingford, CT (US)

(73) Assignee: AT&T Intellectual Property I, L.P., Reno, NV (US)

( * ) Notice: Subject to any disclaimer, the term of this patent is extended or adjusted under 35 U.S.C. 154(b) by 621 days.

(21) Appl. No.: 10/998,452

(22) Filed: Nov. 29, 2004

(65) Prior Publication Data

US 2006/0168155 A1    Jul. 27, 2006

(51) Int. Cl.
  *G06F 15/16*  (2006.01)
  *G06F 15/177*  (2006.01)

(52) U.S. Cl. .............. 709/223; 709/220; 709/218; 709/228; 370/235; 370/388; 370/390; 370/418; 370/60; 370/222; 370/227; 370/225; 370/228; 370/400

(58) Field of Classification Search ............ 709/223, 709/224; 370/392, 216, 467, 222, 227
  See application file for complete search history.

(56) References Cited

U.S. PATENT DOCUMENTS

| | | | |
|---|---|---|---|
| 6,304,546 B1 * | 10/2001 | Natarajan et al. ........... 370/216 |
| 6,490,622 B1 | 12/2002 | Nagami et al. | |
| 6,658,022 B1 * | 12/2003 | West et al. ................ 370/467 |
| 6,717,944 B1 * | 4/2004 | Bryden et al. ............. 370/392 |
| 6,975,588 B1 * | 12/2005 | Katukam et al. ........... 370/222 |
| 7,113,512 B1 * | 9/2006 | Holmgren et al. ...... 370/395.53 |
| 2002/0131418 A1 | 9/2002 | Raftelis et al. | |
| 2004/0004966 A1 | 1/2004 | Foster et al. | |

OTHER PUBLICATIONS

"International Preliminary Report on Patentability," issued by the International Bureau on Aug. 26, 2008, in connection with counterpart international application No. PCT/US2005/031307 (10 pages).
Meggyesi, Zoltan, Fibre Channel Overview, Research Article for Particle and Nuclear Physics, 10 pages, Printed on Oct. 25, 2004.
Fujitsu, Making Ethernet Over SONET Fit a Transport Network Operations Model, Article from Fujitsu, 12 pages, Printed on Jan. 29, 2004.
Pidgeon, Nick, How Ethernet Works, http://computer.howstuffworks.com/Ethernet.htm/printable, 10 pages, Printed on Oct. 18, 2004.
Tyson, Jeff, How LAN Switches Work, http://computer.howstuffworks.com/lan-switch.htm/printable, 20 pages, Printed on Oct. 18, 2004.

(Continued)

*Primary Examiner*—Jude J Jean Gilles
(74) *Attorney, Agent, or Firm*—Hanley, Flight & Zimmerman, LLC (57) ABSTRACT

Methods and systems for identifying communication circuits are disclosed. In particular a communication circuit communicatively couples a first node to a second node. A virtual circuit identification is then obtained based on a first address associated with the first node and a second address associated with the second node. The communication circuit is then identified based on the virtual circuit identification.

50 Claims, 8 Drawing Sheets

OTHER PUBLICATIONS

Franklin, Curt, How Routers Work, http://computer.howstuffworks.com/router.htm/printable, 11 pages, Printed on Oct. 19, 2004.

Norton, Michael, Layer 3 Switching—Introducing the Router, http://www.oreillynetcom, 5 pages (Apr. 13, 2001).

SBC, Syncronous Optical Network (SONET), http://www02.sbc.com/Products_Services/Business/ProdInfo_1/1,,1559--1-1-1-0,00.html, 4 pages, Printed on Oct. 19, 2004.

SBC, GigaMAN Service, http://www02.sbc.com/Products_Services/Business/ProdInfo_1/1,,1545--1-1-1-0,00.html, 2 pages, Printed on Oct. 19, 2004.

Tektronix, Inc., SONET Telecommunications Standard: The Benefits of SONET, www.tektronix.com/optical, 2 pages (Sep. 6, 2001).

Tektronix, Inc., SONET Telecommunications Standard: Glossary, www.tektronix.com/optical, 6 pages, (Sep. 6, 2001).

Tektronix, Inc., SONET Telecommunicatinos Standard: Overhead, www.tektronix.com/optical, 8 pages (Sep. 6, 2001).

Norton, Michael, Understanding Routing Protocols, www.oreillynet.com, 6 pages (May 22, 2001).

McClellan, Rolf, "Designing the new MAN", www.nwfusion.com/research/2001/1105feat.html, 9 pages, printed on Oct. 29, 2004.

Network World Fusion, "Point-to-point Ethernet-based MAN", www.nwfusino.com/research/2001/1105featman.html, 3 pages, printed on Oct. 29, 2004.

* cited by examiner

VCID Mapping Table

| VCID | CIDs | NODES |
|---|---|---|
| D-F | 60, 62 | D,F |
| D-E | 60, 61, 63 | D,G |
| F-G | 62, 63, 64, 65 | F,G |
| D-G | 60, 63, 64, 65 | D,G |
| A-B | 50, 51 | A,B |

CID Mapping Table

| CID | VCIDs |
|---|---|
| 60 | D-F, D-E, D-G |
| 61 | D-E |
| 62 | D-F, F-G |
| 63 | D-E, F-G, D-G |
| 64 | F-G, D-G |
| 65 | F-G, D-G |
| 50 | A-B |
| 51 | A-B |

VIRTUAL CIRCUIT IDENTIFICATIONS FOR HYBRID POINT-TO-POINT NETWORKS

FIELD OF THE DISCLOSURE

The present disclosure relates generally to communication networks and, more particularly, to identifying communication networks via virtual circuit identifications.

BACKGROUND

Communication systems are typically configured to communicate voice, data, and/or any other information from one location to another. An example communication system is a point-to-point communication system or network that may be established between two locations by communicatively coupling one or more communication circuit segments or network segments between those locations. For example, a customer seeking to communicate large amounts of information between two office locations may lease a point-to-point network (PTPN) from a service provider. If the two office locations are within the same service area, the PTPN may be formed using one or more communication circuit segments owned by a single service provider. If the two office locations are separated by a distance that spans multiple service areas, circuit segments owned by one or more service providers may be used to form the PTPN.

Communication systems are typically implemented based on a seven layer Open Systems Interconnection (OSI) reference model, which ensures the interoperability of different communication technologies and equipment made by different manufacturers. The seven layers define different aspects of communication systems and include a physical layer, a data link layer, a network layer, a transport layer, a session layer, a presentation layer, and an application layer. Service providers typically offer PTPNs based on the physical layer (i.e., layer one) and the data link layer (i.e., layer two). The physical layer defines the hardware (e.g., copper, fiber optics, etc.) and the hardware protocols (e.g., signaling, layer-one framing, connectivity, etc.) used to communicate data. Example layer-one technologies include time division multiplexing (TDM) technologies and wave division multiplexing (WDM) technologies. Example TDM technologies are T1 lines, Digital Signal Level (DS-n) lines, Synchronous Optical Network (SONET)/Synchronous Digital Hierarchy (SDH) systems, etc. Example WDM technologies include dense WDM (DWDM) and coarse WDM (CWDM) technologies. An example layer-one standard used in conjunction with WDM technologies is a lambda circuit. A lambda circuit may be used to transmit a plurality of light waves over an optical cable. Each light wave is referred to as a lambda and is transmitted using a wavelength different from the wavelengths of the other light waves using a WDM technology. As a result, all of the light waves may be transmitted simultaneously via the lambda circuit. The data link layer (i.e., layer two) defines various communication protocols used to ensure data integrity. Example data link layer protocols include Ethernet, Gigabit Ethernet, Fibre Channel, Token Ring, Fiber Distributed Data Interface (FDDI), Point-to-Point Protocol (PPP), and Frame Relay.

In the past, layer-two data frames were transported over a PTPN via a single type of layer-one technology using, for example, an Ethernet over SONET service, an Ethernet over lambda service (e.g., Ethernet over CWDM, Ethernet over DWDM, etc.), a Frame Relay over Asynchronous Transfer Mode (ATM) service, etc. For instance, an Ethernet over SONET service may be used with a PTPN having one or more SONET circuit segments communicatively coupled between two nodes (e.g., source and destination nodes). Data is communicated using the Ethernet over SONET service by embedding the data in a layer-two Ethernet data frame and then embedding the Ethernet data frame in a layer-one SONET data frame. The data remains within the same SONET data frame as it is transmitted through the PTPN.

Some PTPN networks include layer one technologies transmitted over other layer one technologies. An example PTPN having embedded layer one technologies includes a T1/SONET PTPN, in which a T1 circuit segment is implemented within each SONET circuit segment of the T1/SONET PTPN. In this case, an Ethernet over T1/SONET service may be implemented by embedding data into an Ethernet data frame, embedding the Ethernet data frame into a T1 data frame, embedding the T1 data frame into a SONET data frame, and transmitting the SONET data frame via the T1/SONET PTPN.

A PTPN may be formed using one or more circuit segments depending on the distance over which the point-to-point network is implemented. For example, a PTPN may be a metropolitan area network (MAN) that is within a single service area such as within one city, one metropolitan area, or one local access and transport area (LATA) and may be implemented using one or more circuit segments owned by a single service provider. However, a PTPN that spans multiple service areas such as, for example, multiple LATAs, a country, etc. may be referred to as a wide area network (WAN) and implemented using a plurality of circuit segments, each of which may be owned by a different service provider. In the latter case, each service provider is responsible for managing and maintaining their portion or segments of the PTPN.

Traditionally, service providers assign a circuit identification (CID) to the communication circuit that forms each PTPN and use the CID for operations, management, administration, and provisioning (OAMP). A CID may be used to identify a PTPN having one or more circuit segments, provided all of the circuit segments are implemented using the same layer-one technology (e.g., all circuit segments are SONET segments or all circuit segments are DWDM segments). For example, an Ethernet over SONET (EoS) PTPN traversing multiple LATAs may be implemented using a plurality of SONET segments and may be identified at any location along the EoS PTPN using a single CID because the layer-one technology (e.g., SONET) is consistent throughout the communication circuit.

Although recent technology developments enable communicatively coupling circuit segments of different layer-one technologies to form a single PTPN, each segment of a different layer-one technology requires a different CID. Managing multiple CIDs for a PTPN is especially complicated when multiple service providers cooperatively form the PTPN. For example, if a customer experiences a data communication problem, the service providers that own portions of the PTPN need to work cooperatively to troubleshoot the problem. Such cooperative work is complicated when each service provider refers to their portion of the PTPN by a different CID. Additionally, using multiple CIDs throughout a PTPN requires service providers to analyze which CIDs from which service provider are connected to their CIDs.

DETAILED DESCRIPTION

Although the following discloses example methods and systems, it should be noted that such methods and systems are merely illustrative and should not be considered as limiting. For example, it is contemplated that any or all of these example methods and systems may be implemented in alternate configurations including more or fewer features than those described herein. Accordingly, while the following describes example methods and systems, persons having ordinary skill in the art will readily appreciate that the examples provided are not the only way to implement such example methods and systems.

The example methods and systems described herein are associated with hybrid point-to-point networks (PTPNs) comprising different OSI layer-one technologies. More specifically, the example methods and systems may be used to identify a hybrid PTPN based on a virtual circuit identification (VCID). Unlike traditional PTPNs, a hybrid PTPN may be implemented using multiple communication circuits or circuit segments of different layer-one technologies. Hybrid PTPNs offer several benefits to customers and service providers. For example, a customer having a lease agreement on a PTPN between two sites using an older or a lower bandwidth layer-one technology may expand the PTPN to span between one or more additional sites using newer, higher bandwidth layer-one technologies by re-using part of the already established PTPN. A service provider having networks based on older layer-one technologies can incrementally upgrade portions of their networks as needed without having to replace entire PTPNs at one time. In addition, service providers working cooperatively to form PTPNs across several service areas need not support the same layer-one technologies. However, in hybrid PTPNs each circuit segment is typically identified using a different CID because the layer-one technology used for communicating data changes as the data is transferred from one circuit segment to the next.

Assigning a plurality of CIDs to a hybrid PTPN makes the OAMP of that network substantially more complex than the OAMP of PTPNs using a single layer-one technology. For example, multiple service providers that cooperatively form a hybrid PTPN may each assign a different CID to their portion of the hybrid PTPN if the layer-one technology used to implement their portion is different from the other layer-one technologies in the hybrid PTPN. In particular, troubleshooting a hybrid PTPN that traverses multiple service providers is more complex because each service provider refers to their portion of the hybrid PTPN using one or more different CIDs.

A VCID may be generated based on node addresses of a PTPN that is configured to communicate data across each circuit segment of the PTPN using the same layer-two protocol (e.g., Ethernet). The VCID may be associated with each circuit segment in the PTPN so that each circuit segment may be identified based on the VCID. In this manner, any number of service providers may use any number of layer-one technologies to form a hybrid PTPN without complicating the process of identifying which circuit segments are associated with the PTPN. Enabling multiple service providers to refer to their respective portions of the hybrid PTPN using the same VCID substantially reduces or eliminates the complexity of servicing, managing, troubleshooting, and OAMP of a hybrid PTPN that traverses multiple service areas.

Communicating data over a PTPN (e.g., a hybrid PTPN) involves framing the data and associated source and destination addresses in a layer-two frame (e.g., an Ethernet frame). The frame is then communicated from the source node to the destination node via one or more circuit segments that are communicatively coupled to form a communication path between the nodes. A VCID may be generated based on the addresses of the source and destination nodes and subsequently used to identify each circuit segment that communicatively couples the nodes. An example method of generating a VCID involves concatenating a source address to a destination address or concatenating at least a portion of the source address to at least a portion of the destination address. For example, a source address AA-AA-AA-AA-AA-AA and a destination address BB-BB-BB-BB-BB-BB may be used (e.g., concatenated) to form a VCID AA-AA-AA-AA-AA-AA-BB-BB-BB-BB-BB-BB. Alternatively, the source and destination addresses may be used (e.g., concatenated) to form a VCID AA-AA-AA-BB-BB-BB.

Using the same layer-two protocol throughout the PTPN ensures that the source and destination addresses are consistent throughout the PTPN. For purposes of clarity, the example systems and methods are described based on the Ethernet layer-two protocol. However, any other suitable layer-two protocol may be used to implement the example systems and methods.

Figure 1:
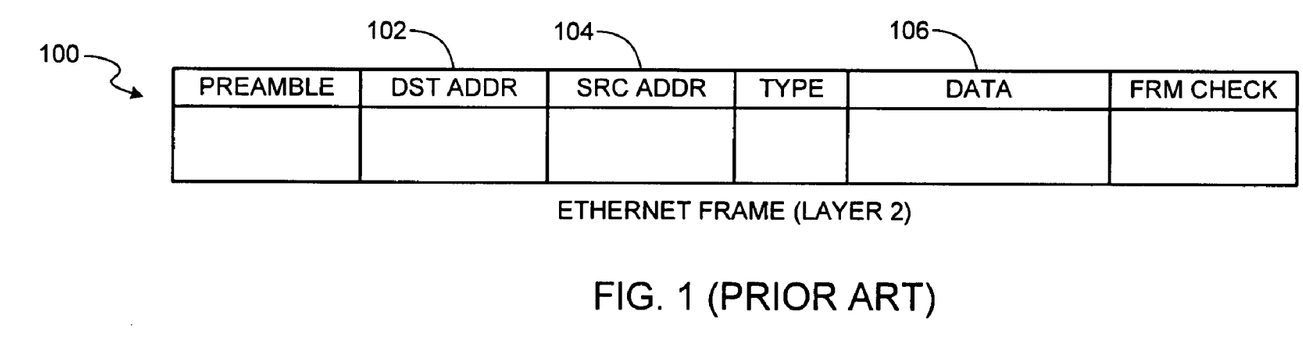
FIG. 1 illustrates a known Ethernet data frame.

FIG. 1 illustrates a known Ethernet data frame 100. The Ethernet data frame 100 may be used to communicate data from a source node to a destination node according to the Ethernet layer-two standard. The Ethernet data frame 100 includes a destination address field 102, a source address field 104, and a data field 106. When data is communicated, the data is framed within the Ethernet data frame 100 by storing the data in the data field 106, storing the address of a destination node in the destination address field 102, and storing the address of a source node in the source address field 104. Although an Ethernet frame is illustrated, the example methods and systems described herein may be used with a Gigabit Ethernet (GE) frame, a Token Ring frame, a PPP frame, or any other suitable layer-two frame.

Figure 2:
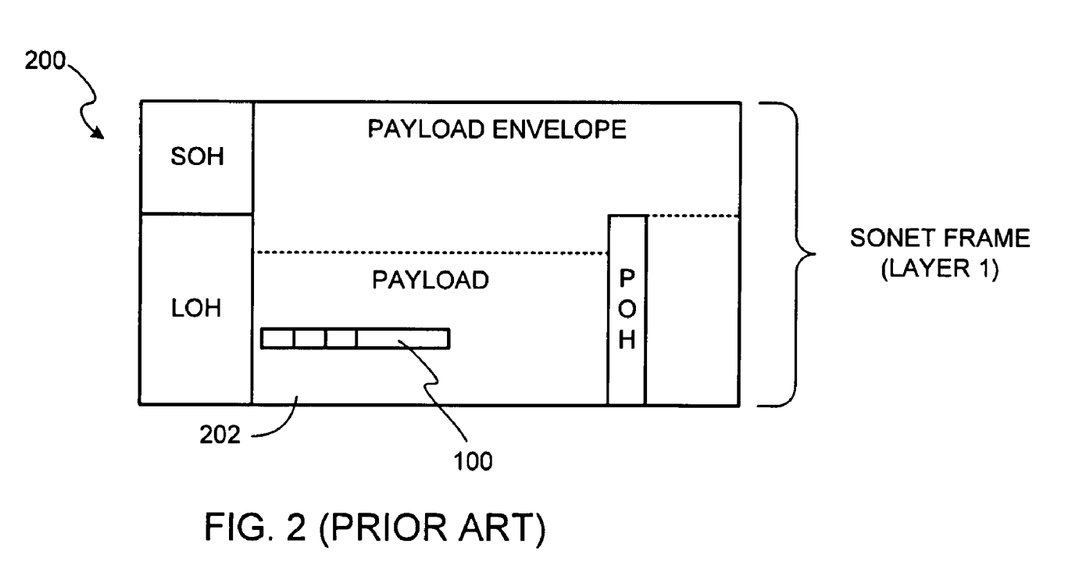
FIG. 2 illustrates a known SONET data frame.

FIG. 2 illustrates a known SONET data frame 200. The SONET data frame 200 is a layer-one frame used to communicate information over a layer-one SONET circuit. The SONET data frame 200 is used for illustrative purposes only to describe the manner in which a layer-two frame may be communicated over a layer-one circuit. Of course, the example methods and apparatus described herein may be used in combination with any other layer-one technology including layer-one technologies that do not define specific layer-one frames.

As shown in FIG. 2, the SONET data frame 200 includes a payload field 202. The payload field 202 includes the data that is to be communicated over a SONET circuit while the other fields of the SONET data frame 200 include overhead or protocol information to ensure the integrity and proper communication of the data. When a SONET circuit receives an Ethernet data frame (e.g., the Ethernet data frame 100 of FIG. 1) the Ethernet data frame is stored within the payload field 202.

Figure 3:
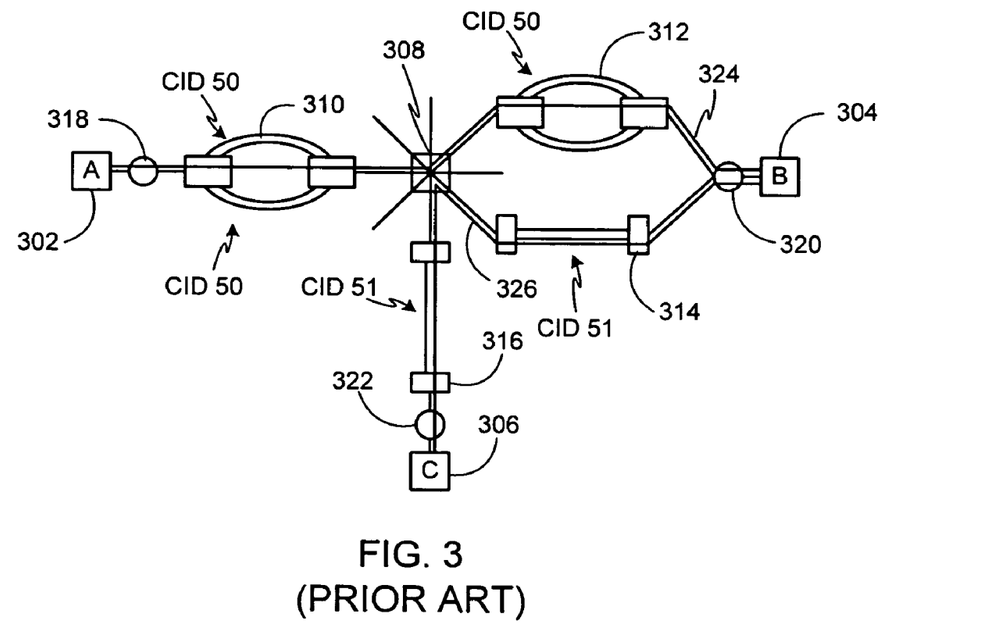
FIG. 3 illustrates an example point-to-point network configuration.

FIG. 3 illustrates a traditional PTPN configuration 300. The PTPN configuration 300 is shown as communicatively coupling various nodes or customer sites to one another via a plurality of circuit segments including SONET circuits and WDM circuits. The WDM circuits are implemented using lambda circuits. However, the WDM circuits may be implemented using any other suitable type of circuit. The PTPN configuration 300 may be implemented within a single service area or LATA and all of the circuit segments may be provided by a single service provider. As described below, FIG. 3 illustrates the manner in which a service provider traditionally provisions circuit segments for PTPNs.

As shown in FIG. 3, a first node A 302 is communicatively coupled to a second node B 304 and the second node B 304 is communicatively coupled to a third node C 306. The PTPN configuration 300 comprises a cross connect 308, a first SONET circuit segment 310, a second SONET circuit segment 312, a first lambda circuit segment 314, and a second lambda circuit segment 316. A first demarcation 318, a second demarcation 320, and a third demarcation 322 illustrate respective boundaries between the customer's equipment (e.g., switches, routers, LANs, etc.) at the nodes 302, 304, and 306 and the service provider's equipment (e.g., the cross connect 308 and the circuit segments 310, 312, 314, and 316).

The letter designations (e.g., A, B, and C) associated with the nodes 302, 304, and 306 represent network addresses such as, for example, physical addresses that may include media access control (MAC) addresses. Network addresses are typically represented as a string of alphanumeric characters. For example, a MAC address is typically represented using the format xx-xx-xx-xx-xx-xx. However, for simplicity and clarity, addresses are represented herein using capital letters (e.g., A, B, C, D, etc.).

The PTPN configuration 300 illustrates an Ethernet over SONET (EoS) PTPN and an Ethernet over lambda (e.g., Ethernet over DWDM, Ethernet over CWDM, etc.) PTPN. The EoS PTPN is configured to communicate data between the nodes 302 and 304 and the Ethernet over lambda PTPN is configured to communicate data between the nodes 304 and 306. A customer may select between different layer-one technologies based on bandwidth requirements. For example, Ethernet over lambda PTPNs may be established between nodes that require relatively larger amounts of bandwidth than an EoS PTPN can support. Different layer-one technologies are used for each PTPN because the bandwidth requirement between the nodes 302 and 304 is different than the bandwidth requirement between the nodes 304 and 306. In particular, the bandwidth requirement between the nodes 302 and 304 is relatively less than the bandwidth requirement between the nodes 304 and 306.

As shown in FIG. 3, the SONET segment 310 is communicatively coupled to the second SONET segment 312 at the cross connect 308 to form a communication path 324 configured to communicate Ethernet frames within SONET frames. Specifically, an EoS service may communicate data via the communication path 324 by first framing the data in an Ethernet frame (e.g., the Ethernet frame 100 of FIG. 1) and embedding or mapping the Ethernet frame within the payload of a SONET frame (e.g., the payload field 202 of the SONET frame 200 of FIG. 2) prior to communicating the data over the SONET segment 310. The SONET data frame is then communicated over the SONET segment 310 to the cross connect 308. The cross connect 308 is configured to hand off or transfer data frames between circuit segments (e.g., between the SONET segments 310 and 312) without modifying the data frames and may be implemented in a wire center using, for example, a network hub. After the SONET data frame is handed off from the SONET segment 310 to the SONET segment 312, the SONET data frame is communicated to the node 304.

For purposes of OAMP, the service provider may assign a CID (e.g., CID 50) to the SONET segments 310 and 312 to identify the EoS PTPN between the node 302 and the node 304. Both of the SONET segments 310 and 312 are assigned the same CID 50 because they form an EoS PTPN comprising a single layer-one technology (e.g., SONET) that communicates information in the same manner throughout the entire EoS PTPN. The service provider may identify the entire EoS PTPN based on CID 50 for purposes of troubleshooting, maintaining, and managing the EoS PTPN.

As shown in FIG. 3, an Ethernet over lambda PTPN is configured to communicate data between the nodes 304 and 306. The first lambda segment 314 is communicatively coupled to the second lambda segment 316 at the cross connect 308 to form a communication path 326 between the second node 304 and the third node 306. CID 51 is assigned to the lambda circuit segments 314 and 316.

Figure 4:
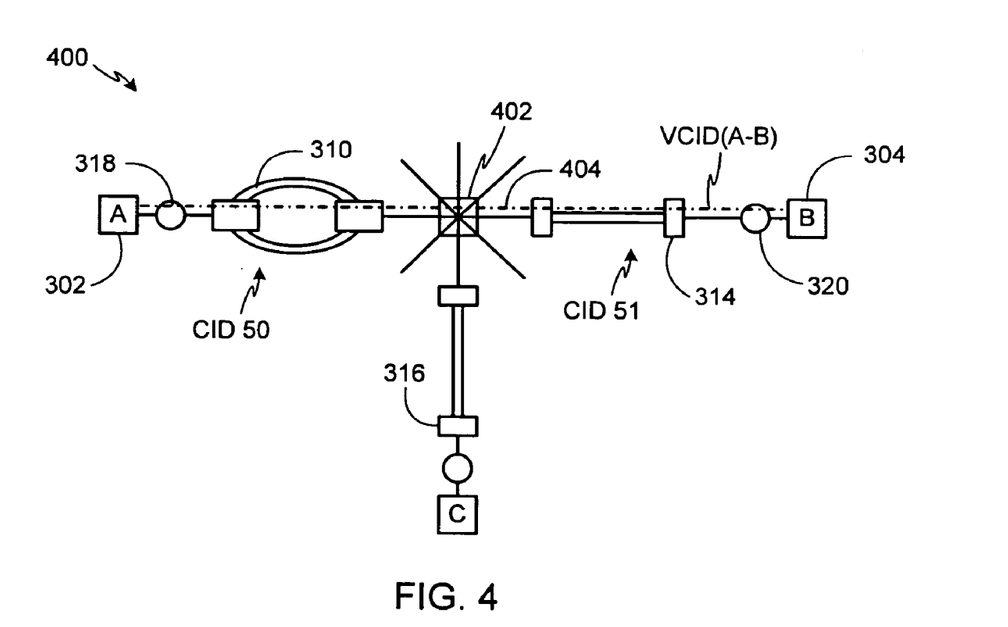
FIG. 4 illustrates an example hybrid point-to-point network that is identified using a virtual circuit identification.

The need to use a single layer-one technology throughout a traditional PTPN may incur additional expenses on a customer. For example, the PTPN configuration 300 incurs additional expenses on a customer because two circuit segments are established between the node 304 and the cross connect 308. Recent technology developments enable service providers to couple circuit segments of different layer-one technologies to form hybrid PTPNs. However, hybrid PTPNs complicate OAMP because identifying each circuit segment in the hybrid PTPNs is more complicated than in traditional or non-hybrid PTPNs. More specifically, each circuit segment is assigned a different CID because data is not communicated in the same manner through each circuit segment of a hybrid PTPN. For example, in the EoS PTPN (e.g., CID 50) described above, SONET frames (e.g., the SONET data frame 200 of FIG. 2) is merely handed off from the first SONET segment 310 to the second SONET segment 312 at the cross connect 308 so that the same SONET frames that are communicated over the first SONET segment 310 are also communicated over the second SONET segment 312. However, in a hybrid PTPN formed by communicatively coupling a SONET circuit segment and a lambda circuit segment, when a SONET frame is received at the lambda segment from the SONET segment, the SONET frame must be removed before the data is communicated over the lambda segment. In this case, the CIDs of the SONET segment and the lambda segment are different because information is transmitted differently over each segment. Assigning different CIDs to different circuit segments of a hybrid PTPN complicates the troubleshooting, maintenance, and the OAMP of a hybrid PTPN. As described below, assigning VCIDs to hybrid PTPNs significantly reduces the complexity of identifying the circuit segments in hybrid PTPNs and reduces or eliminates the complexity of troubleshooting, maintaining, and the OAMP of hybrid PTPNs FIG. 4 illustrates an example hybrid PTPN 400 that is identified using a VCID. Unlike the traditional or non-hybrid PTPN configuration 300, the hybrid PTPN 400 is formed by communicatively coupling different layer-one technologies to form a hybrid PTPN between the nodes 302 and 304. In addition, the hybrid PTPN 400 is configured to communicate data via different layer-one technologies using a layer-two Ethernet protocol. The example hybrid PTPN 400 is formed by communicatively coupling the first SONET segment 310 to the first lambda segment 314 at a cross connect 402 to form a communication path 404. In this manner, the second SONET segment 312 (FIG. 3) may be eliminated.

As shown in FIG. 4, the SONET segment 310 is assigned CID 50 and the lambda segment 314 is assigned CID 51. However, to reduce or eliminate the OAMP complexities associated with having multiple CIDs, VCID(A-B) is assigned to the communication path 404. The VCID(A-B) is generated based on the addresses (e.g., the physical addresses, the media access control (MAC) addresses, etc.) of the nodes 302 and 304 that are stored in the Ethernet frames (e.g., the Ethernet frame 100 of FIG. 1) used to communicate data between the nodes 302 and 304.

The hybrid PTPN 400 may communicate data via the communication path 404 by first framing the data in an Ethernet data frame (e.g., the Ethernet data frame 100 of FIG. 1), embedding or mapping the Ethernet data frame in the payload of a SONET data frame (e.g., the payload field 202 of the SONET data frame 200 of FIG. 2), and communicating the SONET data frame via the SONET segment 310 to the cross connect 402. The SONET data frame is terminated at the cross connect 402 as it exits the SONET segment 310. The SONET data frame is removed at the cross connect 402 and the Ethernet data frame is communicated to the lambda segment 314.

The cross connect 402 may include Ethernet over SONET network interface hardware and Ethernet over lambda network interface hardware. Example network interface hardware often used to terminate Ethernet includes 1000Base-(xx) hardware (e.g., 1000Base-LX hardware, 1000Base-SX hardware, 1000Base-CX hardware, etc.). Such hardware may be implemented as a network switch capable of cross connecting SONET circuits to lambda circuits. In some cases, 1000Base-(xx) hardware may be configured to perform optical-electrical-optical (OEO) translations by terminating a plurality of circuit segments and transmitting data received from multiple circuit segments over a single lambda segment. For instance, a 1000Base-(xx) may multiplex the received data onto a single lambda segment by transmitting the received data simultaneously using different wavelengths.

After the Ethernet data frame is transferred or handed off from the SONET segment 310 to the lambda segment 314 by the cross connect 402, the Ethernet data frame is communicated to the node 304 via the lambda segment 314. Although not described in detail, a hybrid PTPN may also be formed between the node 302 and the node 306 by communicatively coupling the SONET segment 310 to the second lambda segment 316 at the cross connect 402. The hybrid PTPN between the node 302 and the node 306 may be assigned VCID(A-C).

If a customer experiences problems with the hybrid PTPN 400, the service provider may identify the circuit segments 310 and 314 based on the VCID(A-B) instead of having to identify each of the circuit segments based on different CIDs (e.g., CID 50 and CID 51). For example, a technician or customer service personnel may determine that the hybrid PTPN 400 includes CID 50 and CID 51 by referring to an entry in a look-up table, database, or other data structure (e.g., the VCID mapping table 600 of FIG. 6) associated with VCID(A-B). If the VCID of a particular hybrid PTPN is unknown, a technician may determine the VCID by reading Ethernet data frames from any of the circuit segments of the hybrid PTPN using, for example, a network analyzer, and extracting the source address from the source address field (e.g., the source address field 104 of FIG. 1) and the destination address from the destination address field (e.g., the destination address field 102 of FIG. 1).

Further, for billing purposes, the service provider may provide a bill for a single VCID (e.g., the VCID(A-B)) instead of multiple bills or multiple line items in a bill for each CID (e.g., CID 50 and CID 51) of a hybrid PTPN (e.g., the hybrid PTPN 400). Unique VCIDs may be generated by ensuring that different node addresses are provided for every node serviced by a service provider so that each hybrid PTPN can be uniquely identified.

Figure 5:
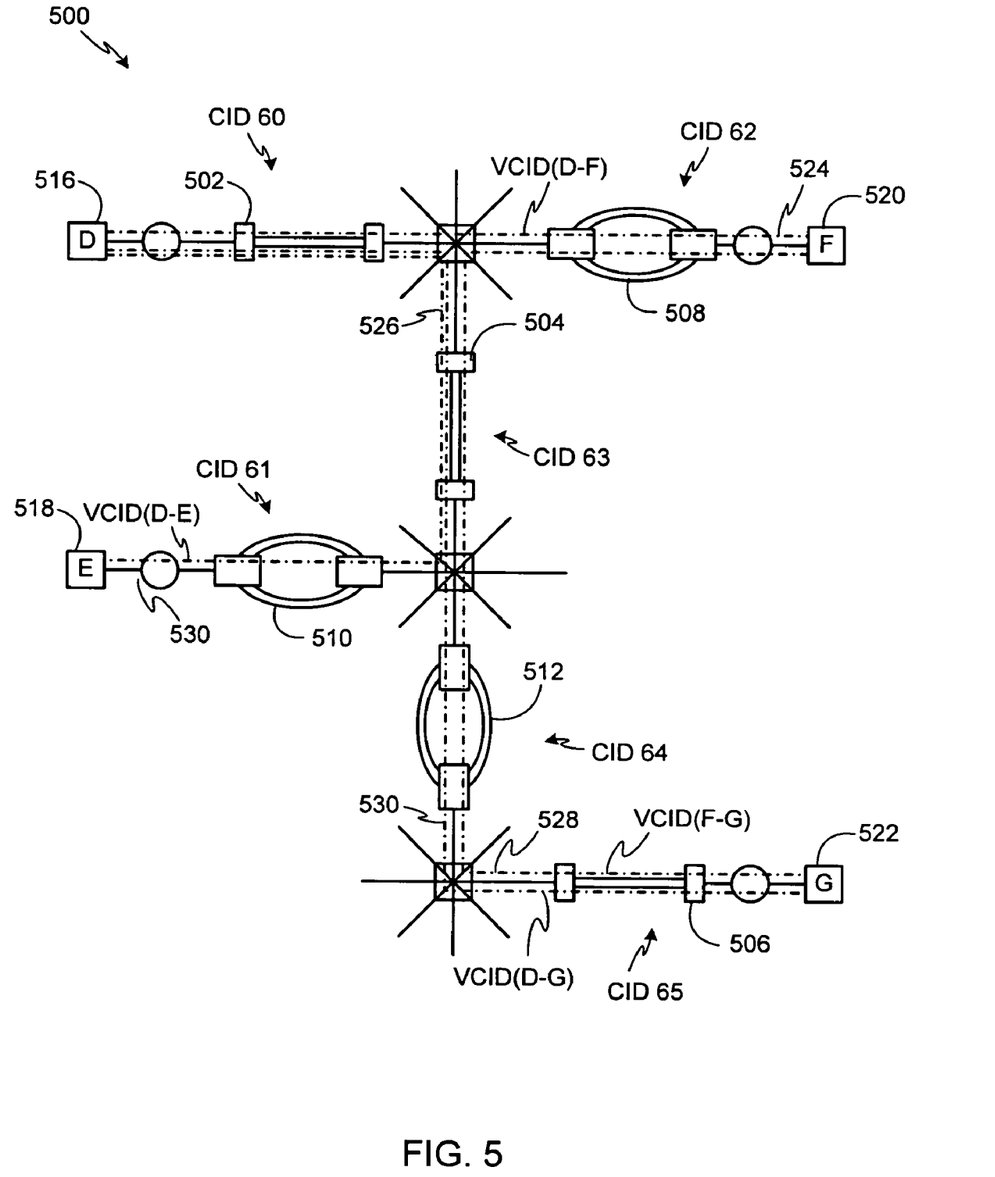
FIG. 5 illustrates a plurality of example hybrid point-to-point networks.

FIG. 5 illustrates a plurality of example hybrid PTPNs 500. The example hybrid PTPNs 500 may be formed using circuit segments owned by the same service provider within a single service area (e.g., a single LATA) or circuit segments owned by several service providers across multiple service areas. Each of the example hybrid PTPNs 500 communicatively couples nodes and is formed using two or more circuit segments. The circuit segments include a plurality of lambda circuit segments 502, 504, and 506 and a plurality of SONET circuit segments 508, 510, and 512. Each of the circuit segments 502, 504, 506, 508, 510, and 512 is assigned a particular CID in the range CID 60 to CID 65. The plurality of nodes includes node D 516, node E 518, node F 520, and node G 522, each of which is communicatively coupled to another node as described below.

Each of the circuit segments shown in FIG. 5 is communicatively coupled to at least one other circuit segment to form a hybrid PTPN that includes a communication path between two nodes. Each of the communication paths is assigned a VCID based on the addresses of the nodes that are communicatively coupled by that path. The lambda segment 502 and the SONET segment 508 are communicatively coupled to form a communication path 524, which is assigned VCID(D-F) because the path 524 communicatively couples the node 516 (D) and the node 520 (F). Similarly, the lambda segments 502 and 504 and the SONET segment 510 are communicatively coupled to form communication path 526. The communication path 526 is assigned VCID(D-E) because the path 526 communicatively couples the node 516 (D) to the node 518 (E). The SONET segments 508 and 512 and the lambda segments 504 and 506 are communicatively coupled to form communication path 528. The communication path 528 is assigned VCID(F-G) because the path 528 communicatively couples the node 520 (F) to the node 522 (G). The lambda segments 502, 504, and 506 and the SONET segment 512 are communicatively coupled to form communication path 530. Accordingly, the communication path 530 is assigned VCID (D-G) because the communication path 530 communicatively couples the node 516 (D) to the node 522 (G).

As shown in FIG. 5, a hybrid PTPN may be formed using any number of circuit segments, each of which may be identified using the VCID of that hybrid PTPN. For example, the communication path 524 is formed using two circuit segments (e.g., the circuit segments 502 and 508) while the communication path 528 is formed using four circuit segments (e.g., the circuit segments 508, 504, 512, and 506).

In some cases, a circuit segment may be used to form a plurality of hybrid PTPNs when that circuit segment has sufficient bandwidth to support the plurality of hybrid PTPNs. For example, the lambda segment 504 is used to form three communication paths (e.g., the communication paths 526, 528, and 530). However, if the lambda segment 504 does not have sufficient bandwidth to support the bandwidth requirements of the three communication paths, an additional circuit segment may be added in parallel to the lambda segment 504. In this manner, some of the communication paths may be formed by the additional circuit segment instead of the lambda segment 504.

If any of the plurality of hybrid PTPNs 500 traverse multiple service areas (e.g., multiple LATAs), the circuit segments of that hybrid PTPN may be owned by different service providers. However, each circuit segment of the hybrid PTPN may still be identified using a single VCID. In this manner, when service providers are working cooperatively to troubleshoot a problem in a particular hybrid PTPN, all of the service providers may find the circuit segments in their portion of the hybrid PTPN based on the same VCID.

Figure 6:
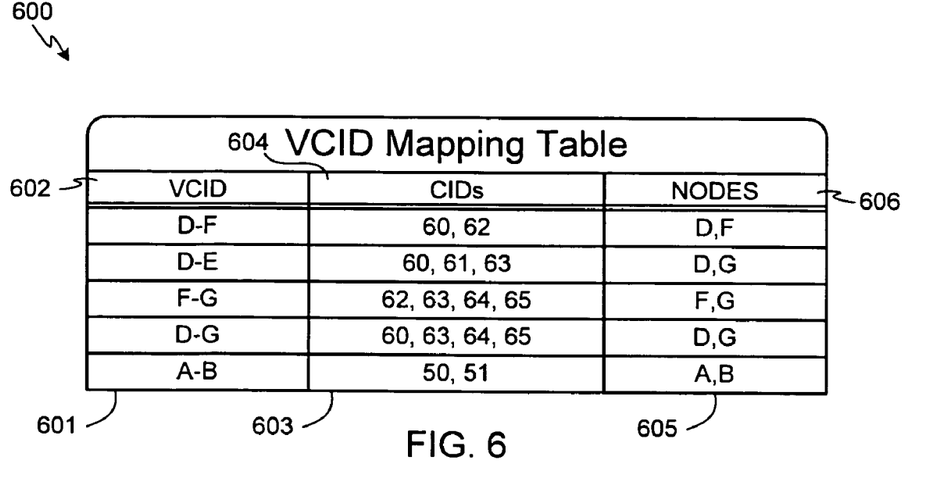
FIG. 6 illustrates an example virtual circuit identification table.
Figure 7:
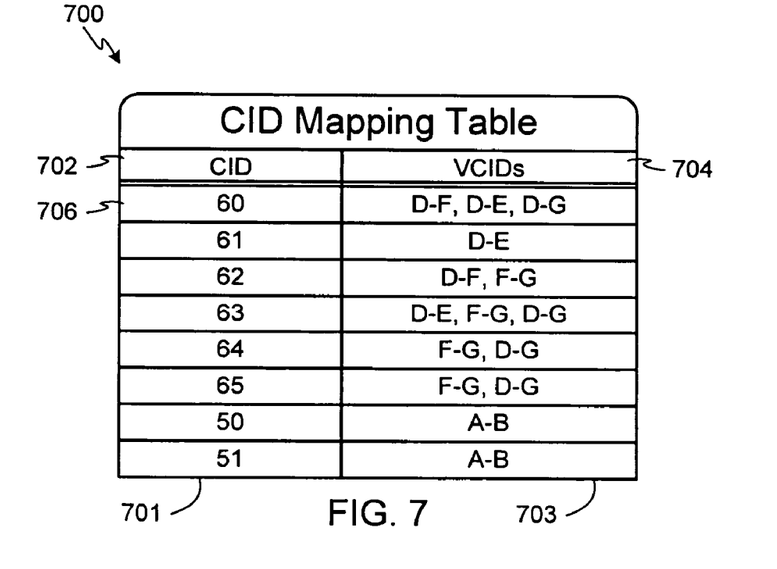
FIG. 7 illustrates an example circuit identification mapping table.

FIG. 6 illustrates an example VCID mapping table 600 and FIG. 7 illustrates an example CID mapping table 700, both of which correspond to the example hybrid PTPN 400 of FIG. 4 and the plurality of example hybrid PTPNs 500 of FIG. 5. Service providers may use the example tables 600 and 700 to identify the circuit segments that form each hybrid PTPN. The information in the tables 600 and 700 may be stored on a machine-accessible medium in the form of a database, a look-up table, or any other suitable data structure having data entries with multiple data fields. Additionally, the information in the example tables 600 and 700 may be accessed by OAMP or network management computer applications and integrated with, for example, billing processes, troubleshooting processes, and/or any other OAMP processes.

As shown in FIG. 6, the example VCID mapping table 600 maps each of the VCIDs illustrated in FIGS. 4 and 5 to its respective circuit segments and nodes. In particular, the example VCID mapping table 600 includes a plurality of data entries, each of which includes a VCID stored in a VCID field 601 of a VCID column 602, corresponding circuit segment CIDs stored in a CIDs field 603 of a CID column 604, and corresponding node names or node addresses stored in a nodes field 605 of a nodes column 606. Thus, for OAMP purposes, a service provider need only know the VCID of a hybrid PTPN to determine the circuit segment CIDs associated with that hybrid PTPN via the table 600.

As shown in FIG. 7, the CID mapping table 700 maps the CID of each circuit segment to corresponding VCIDs. Each circuit segment CID is stored in a CID field 701 of a CID column 702 and each VCID is stored in a VCIDs field 703 a VCIDs column 704. The CID mapping table 700 may be used to determine which hybrid PTPNs are formed using particular CIDs. More specifically, a CID may be looked up in the CID column 702 and the VCIDs associated with that CID may be retrieved from the corresponding entry in the VCIDs column 704. For example, the CID mapping table 700 indicates at data entry 706 that CID 60 is used to form the hybrid PTPNs corresponding to VCID(D-F), VCID(D-E), and VCID(D-G).

The CID mapping table 700 may be used for any troubleshooting, management, or OAMP process. For example, if a service provider determines that it is having problems with circuit segment CID 63, the service provider may use the CID mapping table 700 to determine that the hybrid PTPNs corresponding to VCID(D-E), VCID(F-G), and VCID(D-G) are affected by the problem at CID 63. If any of the hybrid PTPNs traverse multiple service provider areas, the VCIDs of those hybrid PTPNs may be communicated to the other service providers that also service portions of those PTPNs to alert them of the potential problems.

FIGS. 8A-8D are flow diagrams of example methods that may be used to establish a PTPN (e.g., a hybrid PTPN) between two nodes, generate a VCID for the PTPN, and use the VCID to identify one or more circuit segments of the PTPN. For purposes of clarity, the example methods of FIGS. 8A-8D are described with respect to the hybrid PTPN 400 of FIG. 4. However, the example methods may be used in combination with any other hybrid PTPN having fewer or more circuit segments. In addition, although the example methods of FIGS. 8A-8D are described as a particular sequence of operations, one or more operations may be rearranged, added, and/or removed to achieve the same or similar results as those described herein.

Although the example methods of FIGS. 8A-8D are described using separate flow diagrams, each of the example methods may be performed any number of times and in any suitable sequence relative to one another. For example, the example method of FIG. 8B may be performed following the completion of the example method of FIG. 8A and the example methods of FIG. 8C and/or FIG. 8D may be performed following the completion of the example method of FIG. 8B. An alternative example may involve performing the example methods of FIGS. 8A and 8B once and performing the example methods of FIG. 8C and/or FIG. 8D a plurality of times using the information generated in connection with the example methods of FIGS. 8A and 8B.

Figure 8A:
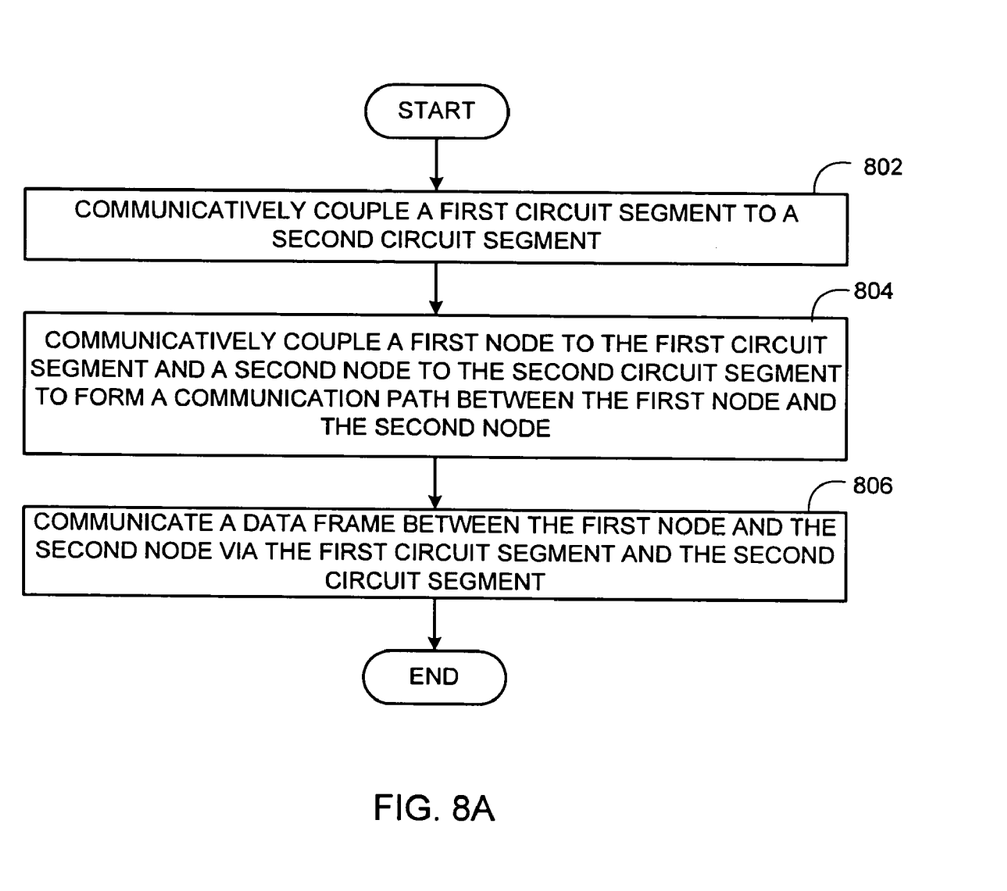
FIG. 8A is a flow diagram of an example method that may be used to establish a point-to-point network.

Now turning in detail to the example method of FIG. 8A, a PTPN such as the hybrid PTPN 400 of FIG. 4 may be established, formed, or otherwise configured by communicatively coupling one or more communication circuit segments between two nodes. Initially, a first circuit segment (e.g., the SONET segment 310 of FIG. 4) is communicatively coupled to a second circuit segment (e.g., the lambda segment 314 of FIG. 4) (block 802). For example, as described above in connection with FIG. 4, the SONET segment 310 may be communicatively coupled to the lambda segment 314 via the cross connect 404.

A first node (e.g., the node 302) is then communicatively coupled to the SONET segment 310 and a second node (e.g., the node 304) is communicatively coupled to the lambda segment 314 to establish the hybrid PTPN 400 and form a communication path (e.g., the communication path 404) between the first node and the second node (block 804). The hybrid PTPN 400 may then be used to communicate a data frame (e.g., an OSI layer-two data frame) between the first node and the second node via the first circuit segment and the second circuit segment (block 806). For example, an Ethernet data frame (e.g., the Ethernet data frame 100 of FIG. 1) may be embedded into the payload field (e.g., the payload field 202 of FIG. 2) of a SONET data frame (e.g., the SONET data frame 200 of FIG. 2) and communicated from the node 302 toward the cross connect 402 via the SONET segment 310. The SONET data frame 200 may then be removed or the Ethernet data frame 100 may be extracted from the payload field 202 of the SONET data frame 200 and the Ethernet data frame 100 may be communicated toward the node 304 via the lambda segment 314.

Figure 8B:
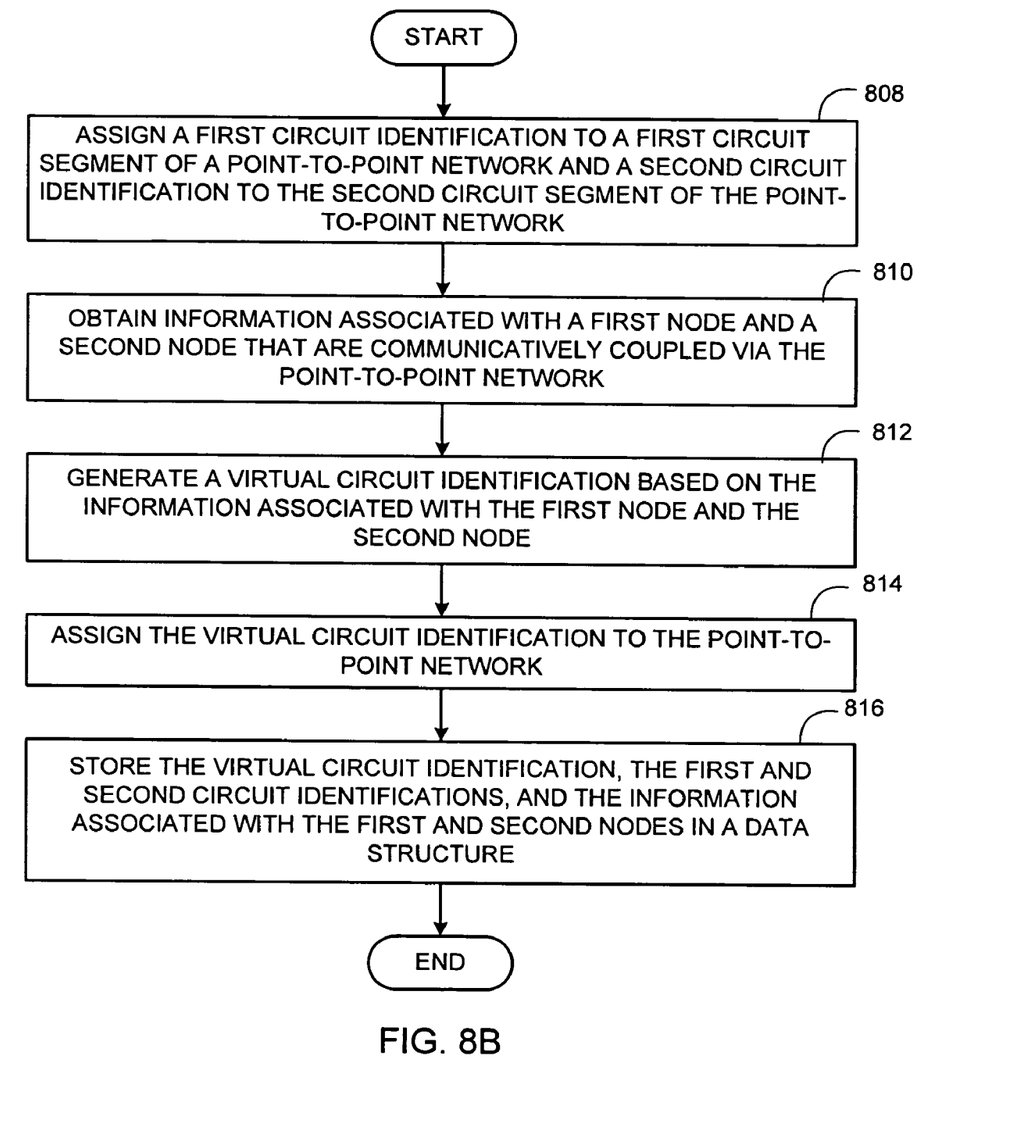
FIG. 8B is a flow diagram of an example method that may be used to generate a virtual circuit identification for the point-to-point network established in connection with the example method of FIG. 8A.

FIG. 8B is a flow diagram of an example method that may be used to generate a VCID for the PTPN (e.g., the hybrid PTPN 400 of FIG. 4) established in connection with the example method of FIG. 8A. A first CID is assigned to a first circuit segment of the PTPN and a second CID is assigned to a second circuit segment of the PTPN (block 808). For example, the CID 50 (FIG. 4) may be assigned to the SONET segment 310 (FIG. 4) of the hybrid PTPN 400 and the CID 51 (FIG. 4) may be assigned to the lambda segment 314 (FIG. 4).

Information associated with the first and second nodes, which are communicatively coupled via the hybrid PTPN 400, is then obtained (block 810). For example, obtaining information associated with the first and second nodes may include obtaining a first address (e.g., A) associated with the node 302 (A) (FIG. 4) and a second address (e.g., B) associated with the second node 304 (B) (FIG. 4).

A VCID (e.g., the VCID(A-B)) is then generated based on the first address (e.g., A) of the first node 302 and the second address (e.g., B) of the second node 304 (block 812) and is assigned to the hybrid PTPN 400 and/or the communication path 404 (block 814). The VCID(A-B) may be generated by concatenating the first address (e.g., A) of the first node 302 to the second address (e.g., B) of the second node 304 or by concatenating at least a portion of the first address and at least a portion of the second address. For example, if the first address is AA-AA-AA-AA-AA-AA and the second address is BB-BB-BB-BB-BB-BB, the VCID(A-B) may be represented as AA-AA-AA-AA-AA-AA-BB-BB-BB-BB-BB-BB by concatenating the source and destination addresses. Alternatively, the VCID(A-B) may be represented as AA-AA-AA-BB-BB-BB by concatenating portions of the source and destination addresses.

The VCID(A-B), the first and second CIDs (e.g., CID 50 and CID 51), and the information (e.g., the addresses A and B) associated with the first and second nodes are then stored in a data structure (e.g., the VCID mapping table 600 of FIG. 6 and/or the CID mapping table of FIG. 7) (block 816). For example, the VCID(A-B), CID 50, CID 51, address A, and address B may be stored in a data entry of a look-up table, database, or other data structure (e.g., the VCID mapping table 600) so that the CID of each circuit segment of the hybrid PTPN 400 (FIG. 4) may be retrieved based on the VCID(A-B) by, for example, using the example method described below in connection with FIG. 8C. In addition, CID 50, CID 51, and VCID(A-B) may be stored in data entries of a data structure (e.g., the CID mapping table 700) so that the VCID(A-B) may be retrieved based on CID 50 or CID 51 as described below in connection with FIG. 8D.

Figure 8C:
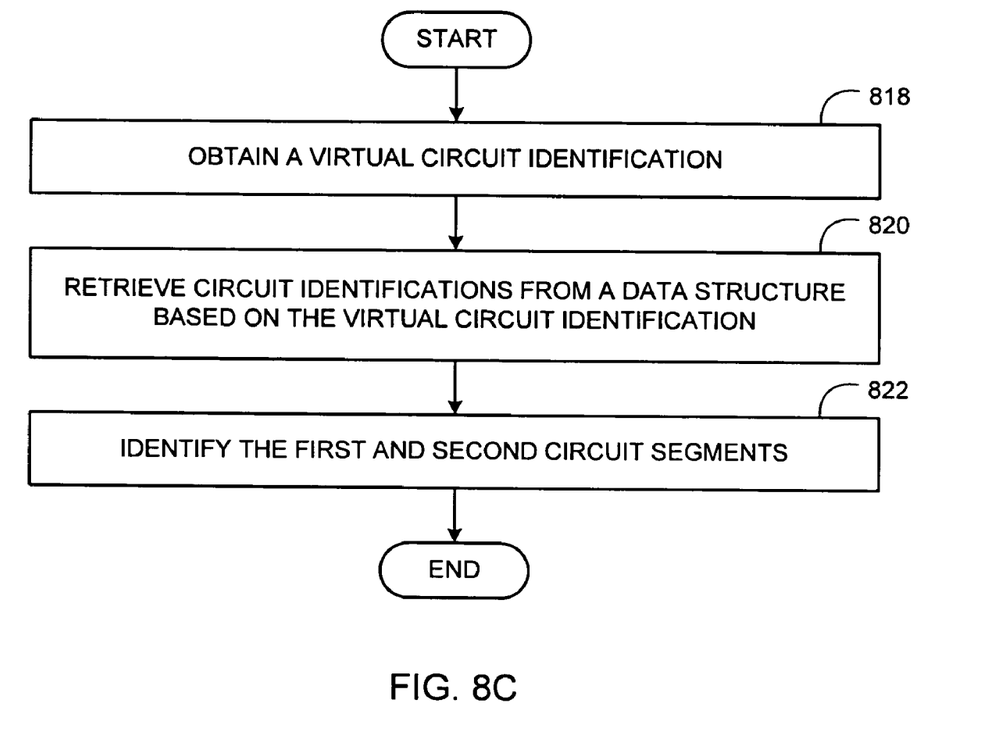
FIG. 8C is a flow diagram of an example method that may be used to identify one or more circuit segments of a point-to-point network based on the virtual circuit identification generated in connection with the example method of FIG. 8B.

FIG. 8C is a flow diagram of an example method that may be used to identify one or more circuit segments of a PTPN (e.g., the hybrid PTPN 400 of FIG. 4) based on, for example, the VCID generated in connection with the example method of FIG. 8B. After the VCID and the CIDs are stored in a data structure (e.g., the VCID mapping table 600 of FIG. 6), a person or a computer application or program (e.g., an OAMP or network management computer application) may obtain a VCID (block 818). The person or the computer application may then retrieve the CIDs from the data structure (block 820). For example, a computer application may access the example VCID mapping table 600 and retrieve CID 50 and CID 51 based on the VCID(A-B). The CIDs may then be used to identify the first and second circuit segments (e.g., the SONET segment 310 and the lambda segment 314) corresponding to the VCID(A-B) (block 822).

Figure 8D:
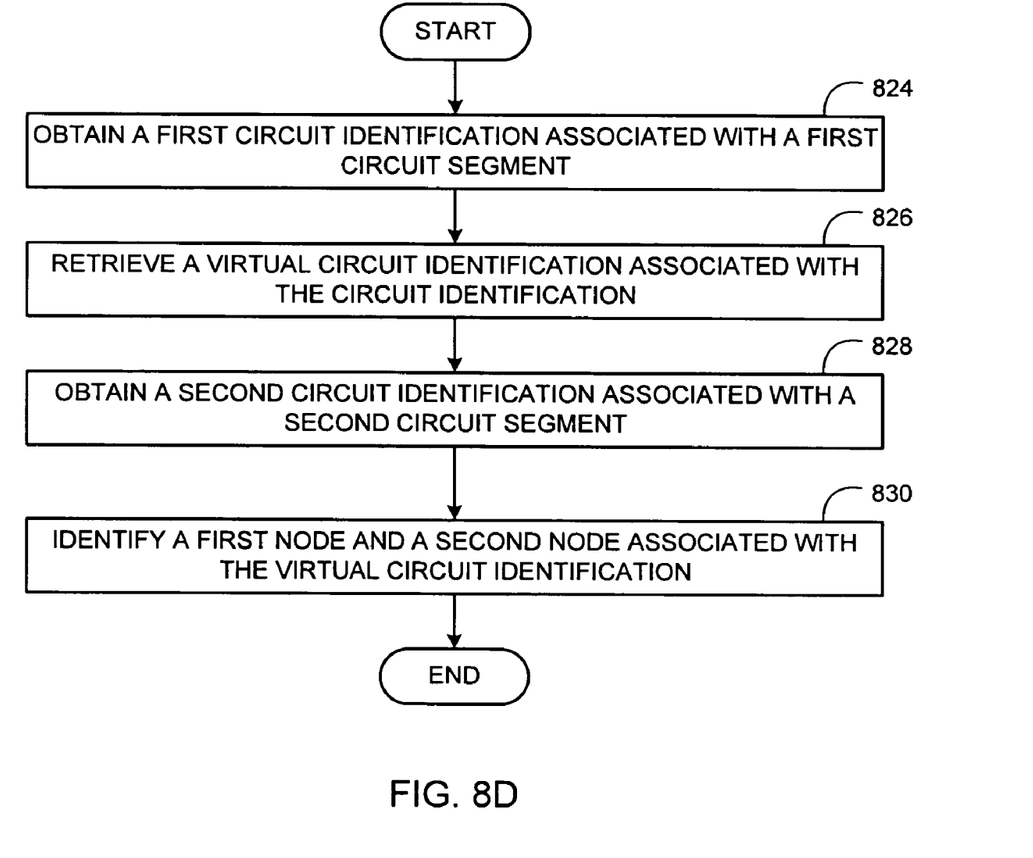
FIG. 8D is a flow diagram of an example method that may be used to obtain a virtual circuit identification associated with a point-to-point network.

FIG. 8D is a flow diagram of an example method that may be used to obtain a VCID associated with a PTPN (e.g., the hybrid PTPN 400 of FIG. 4) based on a CID associated with a circuit segment of the PTPN. The example method of FIG. 8D may also be used to obtain other CIDs associated with the PTPN after the VCID of the PTPN is retrieved. For example, if a person (e.g., a technician, a customer service representative, etc.) or a computer program or application (e.g., an OAMP or network management computer program or application) detects a problem with a particular circuit segment, the CID of that circuit segment may be used to obtain one or more VCIDs of PTPNs that are formed using that circuit segment. The VCIDs may then be used to inform one or more customers of potential service problems. Of course, the example method of FIG. 8D may be used for any other suitable purpose.

Initially, a first CID (e.g., CID 50 of FIG. 4) associated with a first circuit segment (e.g., the SONET segment 310 of FIG. 4) is obtained (block 824). For example, a person or a computer program or application may obtain CID 50, which is assigned to the SONET segment 310 as described above in connection with FIG. 4. The first CID may then be used to obtain or retrieve a VCID (e.g., the VCID(A-B)) associated with a PTPN (e.g., the hybrid PTPN 400 of FIG. 4) (block 826). For example, the VCID(A-B) may be obtained by locating a data entry in the CID mapping table 700 of FIG. 7 that corresponds to the CID 50 and reading the VCID(A-B) from the VCIDs field 703 of that data entry. Although, the operation of block 826 is described as retrieving one VCID, any number of VCIDs associated with the first CID may be retrieved. For example, referring to data entry 706 of FIG. 7, if the first CID is CID 60, any one or more of VCID(D-F), VCID(D-E), and VCID(D-G) may be obtained based on the CID 60.

After a VCID is obtained, the VCID may be used to obtain a second CID (e.g., CID 51 of FIG. 4) associated with a second circuit segment (e.g., the lambda segment 314 of FIG. 4) (block 828) used to form the PTPN associated with the VCID. For example, a data entry in the example VCID mapping table 600 (FIG. 6) that is associated with the VCID(A-B) may be located based on the VCID(A-B) and the CID 51 may be obtained from the CIDs field 603 of that data entry.

The first and second nodes associated with the VCID may then be identified based on the VCID (block 830). For example, the addresses A and B may be read or extracted from the VCID(A-B) to determine that the node 302 (A) (FIG. 4) and the node 304 (B) (FIG. 4) are communicatively coupled via the hybrid PTPN 400, which is assigned the VCID(A-B).

Although certain methods, systems, and articles of manufacture have been described herein, the scope of coverage of this patent is not limited thereto. To the contrary, this patent covers all methods, systems, and articles of manufacture fairly falling within the scope of the appended claims either literally or under the doctrine of equivalents.

What is claimed is:

1. A method of identifying a communication circuit segment, comprising:

coupling a source node to a first communication circuit segment;

coupling a destination node to a second communication circuit segment;

obtaining a virtual circuit identification based on a first address associated with the source node and a second address associated with the destination node; and identifying the first communication circuit segment, the second communication circuit segment, and at least another communication circuit segment coupling the first communication circuit segment to the second communication circuit segment based on the virtual circuit identification.

2. A method as defined in claim 1, wherein the first communication circuit segment is assigned a first circuit identification and the second communication circuit segment is assigned a second circuit identification, and further comprising associating the virtual circuit identification to each of the communication circuit segments by storing the virtual circuit identification in association with each of the first circuit identification and the second circuit identification in a database or a look-up table.

3. A method as defined in claim 1, wherein obtaining the virtual circuit identification comprises reading the first address and the second address from a data frame to be transmitted via the communication circuit segment.

4. A method as defined in claim 3, wherein the data frame is an Ethernet frame or a fibre channel frame.

5. A method as defined in claim 1, wherein the first and second addresses are media access control addresses.

6. A method of identifying a communication circuit segment, comprising:
communicatively coupling a first communication circuit segment to a second communication circuit segment to form a communication path between a source node and a destination node, wherein the first communication circuit segment comprises a first type of communication technology and the second communication circuit segment comprises a second type of communication technology, wherein the first communication circuit segment is coupled to the source node and the second communication circuit segment is coupled to the destination node to communicate a data frame between the source node and the destination node, and wherein a first address associated with the source node and a second address associated with the destination node are stored in the data frame;
obtaining a virtual circuit identification based on the first address and the second address; and
identifying the first communication circuit segment, the second communication circuit segment, and at least another communication circuit segment coupling the first communication circuit segment to the second communication circuit segment based on the virtual circuit identification.

7. A method as defined in claim 6, wherein the data frame is an Ethernet frame or a fibre channel frame.

8. A method as defined in claim 6, wherein the communication path is associated with a point-to-point network.

9. A method as defined in claim 6, wherein the first communication circuit segment is a wave division multiplex circuit and the second communication circuit segment is a Synchronous Optical Network circuit.

10. A method as defined in claim 6, wherein the data frame is transmitted within a Synchronous Optical Network frame via the second communication circuit segment.

11. A method as defined in claim 6, wherein a first circuit segment identification is assigned to the first communication circuit segment and a second circuit segment identification is assigned to the second communication circuit segment and further comprising associating the virtual circuit identification with the first communication circuit segment and the second communication circuit segment by storing the first and second circuit segment identifications in association with the virtual circuit identification in a look-up table or a database.

12. A method as defined in claim 6, wherein the first communication circuit segment is associated with a first service provider and the second communication circuit segment is associated with a second service provider.

13. A method as defined in claim 6, wherein the first communication circuit segment is located in a first local access transport area and the second communication circuit segment is located in a second local access transport area.

14. A method as defined in claim 6, wherein the virtual circuit identification is an Ethernet virtual circuit identification.

15. A method of identifying a plurality of communication circuits, comprising:
transmitting a data frame via a first communication circuit segment coupled to a source node and a second communication circuit segment coupled to a destination node, wherein the data frame includes a source address associated with the source node and a destination address associated with the destination node;
obtaining a virtual circuit identification based on the source address and the destination address; and
associating the first communication circuit segment, the second communication circuit segment, and at least another communication circuit segment coupling the first communication circuit segment to the second communication circuit segment with the virtual circuit identification.

16. A method as defined in claim 15, wherein the first communication circuit segment is associated with a first circuit identification and the second communication circuit segment is associated with a second circuit identification.

17. A method as defined in claim 16, wherein to enable identifying the first communication circuit segment and the second communication circuit segment based on the virtual circuit identification comprises enabling retrieval of the first and second circuit identifications from a database or a look-up table based on the virtual circuit identification.

18. A method of generating a virtual circuit identification, comprising:
obtaining a first address associated with a source node;
obtaining a second address associated with a destination node; and
generating a virtual circuit identification based on the first address and the second address, wherein the virtual circuit identification is mapped to each of a plurality of communication circuit segments of a point-to-point network that communicatively couples the source node to the destination node.

19. A method as defined in claim 18, further comprising storing the virtual circuit identification in a look-up table or a database.

20. A method as defined in claim 18, further comprising associating the virtual circuit identification with a plurality of circuit identifications associated with the plurality of communication circuit segments.

21. A method as defined in claim 18, wherein one of the plurality of communication circuit segments comprises a first type of communication technology and another one of the plurality of communication circuit segments comprises a second type of communication technology.

22. A method as defined in claim 21, wherein the first type of communication technology is a time division multiplexing technology and the second type of communication technology is a wave division multiplexing technology.

23. An apparatus for generating a virtual circuit identification comprising:
a processor; and
a memory communicatively coupled to the processor, the memory including stored instructions that enable the processor to:
obtain a first address associated with a source node;
obtain a second address associated with a destination node; and
generate a virtual circuit identification based on the first address and the second address, wherein the virtual circuit identification is mapped to each of a plurality of communication circuit segments of a point-to-point network that communicatively couples the source node to the destination node.

24. An apparatus as defined in claim 23, wherein the instructions enable the processor to store the virtual circuit identification in a look-up table or a database.

25. An apparatus as defined in claim 23, wherein the instructions enable the processor to associate the virtual circuit identification with a plurality of circuit identifications associated with the plurality of communication circuit segments.

26. An apparatus as defined in claim 23, wherein one of the plurality of communication circuit segments comprises a first type of communication technology and another one of the plurality of communication circuit segments comprises a second type of communication technology.

27. An apparatus as defined in claim 26, wherein the first type of communication technology is a time division multiplexing technology and the second type of communication technology is a wave division multiplexing technology.

28. A machine accessible medium having instructions stored thereon that, when executed, cause a machine to:
 obtain a first address associated with a source node:
 obtain a second address associated with a destination node; and
 generate a virtual circuit identification based on the first address and the second address, wherein the virtual circuit identification is mapped to each of a plurality of circuit segments of a point-to-point network that communicatively couples the source node to the destination node.

29. A machine accessible medium as defined in claim 28 having instructions stored thereon that, when executed, cause the machine to store the virtual circuit identification in a look-up table or a database.

30. A machine accessible medium as defined in claim 28 having instructions stored thereon that, when executed, cause the machine to associate the virtual circuit identification with a plurality of circuit identifications associated with the plurality of circuit segments.

31. A machine accessible medium as defined in claim 28 having instructions stored thereon that, when executed, cause the machine to associated the virtual circuit identification with a first type of communication technology and a second type of communication technology.

32. A machine accessible medium as defined in claim 31, wherein the first type of communication technology is a time division multiplexing technology and the second type of communication technology is a wave division multiplexing technology.

33. A method for identifying a communication circuit segment, comprising:
 obtaining a virtual circuit identification comprising at least a portion of a first address of a first node and at least a portion of a second address of a second node, wherein the first node and the second node are communicatively coupled via a point-to-point network having a plurality of communication circuit segments;
 obtaining a plurality of circuit identifications based on the virtual circuit identification, wherein each of the plurality of circuit identifications is associated with identifying at least one of the plurality of communication circuit segments; and
 identifying at least one of the plurality of communication circuit segments based on at least one of the circuit identifications.

34. A method as defined in claim 33, wherein the virtual circuit identification is obtained from a network management computer application.

35. A method as defined in claim 33, wherein the plurality of circuit identifications are obtained from a data entry in a look-up table or a database, and wherein the data entry is associated with the virtual circuit identification.

36. A method as defined in claim 33, further comprising identifying a time division multiplexing circuit segment and a wave division multiplexing circuit segment based on the plurality of circuit identifications.

37. A method as defined in claim 33, wherein obtaining the virtual circuit identification comprises concatenating the at least the portion of the first address and the at least the portion of the second address.

38. An apparatus for identifying a communication circuit segment comprising:
 a processor; and
 a memory communicatively coupled to the processor, the memory including stored instructions that enable the processor to:
 obtain a virtual circuit identification comprising at least a portion of a first address of a first node and at least a portion of a second address of a second node, wherein the first node and the second node are communicatively coupled via a point-to-point network having a plurality of communication circuit segments;
 obtain a plurality of circuit identifications based on the virtual circuit identification, wherein each of the plurality of circuit identifications is associated with identifying at least one of the plurality of communication circuit segments; and
 identify at least one of the plurality of communication circuit segments based on at least one of the circuit identifications.

39. An apparatus as defined in claim 38, wherein the virtual circuit identification is obtained from a network management computer application.

40. An apparatus as defined in claim 38, wherein the plurality of circuit identifications are obtained from a data entry in a look-up table or a database, and wherein the data entry is associated with the virtual circuit identification.

41. An apparatus as defined in claim 38, wherein the instructions enable the processor to identify a time division multiplexing circuit segment and a wave division multiplexing circuit segment based on the plurality of circuit identifications.

42. An apparatus as defined in claim 38, wherein the instructions enable the processor to obtain the virtual circuit identification by concatenating the at least the portion of the first address and the at least the portion of the second address.

43. A machine accessible medium having instructions stored thereon that, when executed, cause a machine to:
 obtain a virtual circuit identification comprising at least a portion of a first address of a first node and at least a portion of a second address of a second node, wherein the first node and the second node are communicatively coupled via a point-to-point network having a plurality of communication circuit segments;
 obtain a plurality of circuit identifications based on the virtual circuit identification, wherein each of the plurality of circuit identifications is associated with identifying at least one of the plurality of communication circuit segments; and
 identify at least one of the plurality of communication circuit segments based on at least one of the circuit identifications.

44. A machine accessible medium as defined in claim 43, wherein the virtual circuit identification is obtained from a network management computer application.

45. A machine accessible medium as defined in claim 43, wherein the plurality of circuit identifications are obtained from a data entry in a look-up table or a database, and wherein the data entry is associated with the virtual circuit identification.

46. A machine accessible medium as defined in claim 43 having instructions stored thereon that, when executed, cause the machine to identify a time division multiplexing circuit segment and a wave division multiplexing circuit segment based on the plurality of circuit identifications.

47. A machine accessible medium as defined in claim 43 having instructions stored thereon that, when executed, cause the machine to obtain the virtual circuit identification by concatenating the at least the portion of the first address and the at least the portion of the second address.

48. A method as defined in claim 1, further comprising coupling the first communication circuit segment to the second communication circuit segment via at least a third communication circuit segment and identifying the first, second, and third communication circuit segments based on the virtual circuit identification.

49. A method as defined in claim 15, further comprising coupling the first communication circuit segment to the second communication circuit segment via a third communication circuit segment and associating the first, second, and third communication circuit segments with the virtual circuit identification.

50. A method as defined in claim 18, wherein the plurality of communication circuit segments includes a first communication circuit segment coupled to the source node, a second communication circuit segment coupled to the destination node, and a third communication circuit segment coupled between the first and second communication circuit segments.

* * * * *